(No Model.)
2 Sheets—Sheet 1.
R. McMILLIN.
TRUCK.
No. 394,385.
Patented Dec. 11, 1888.
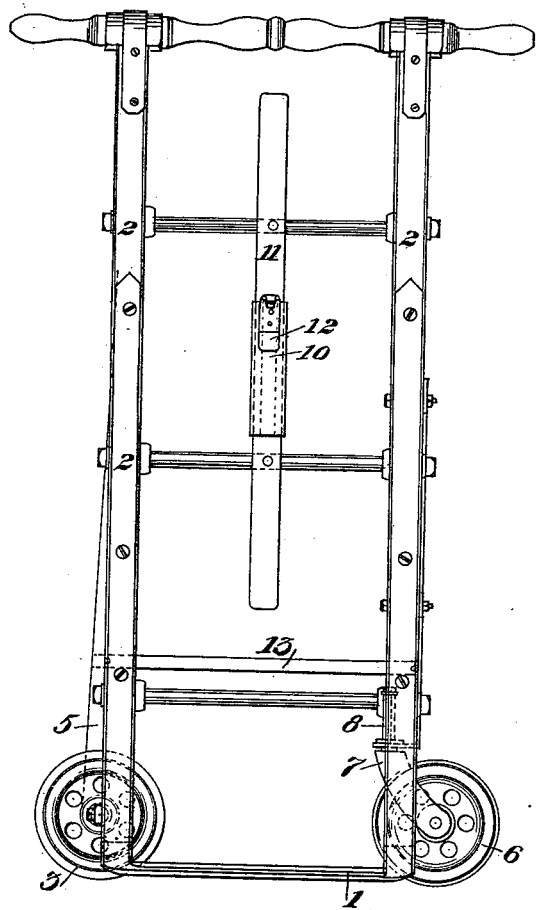
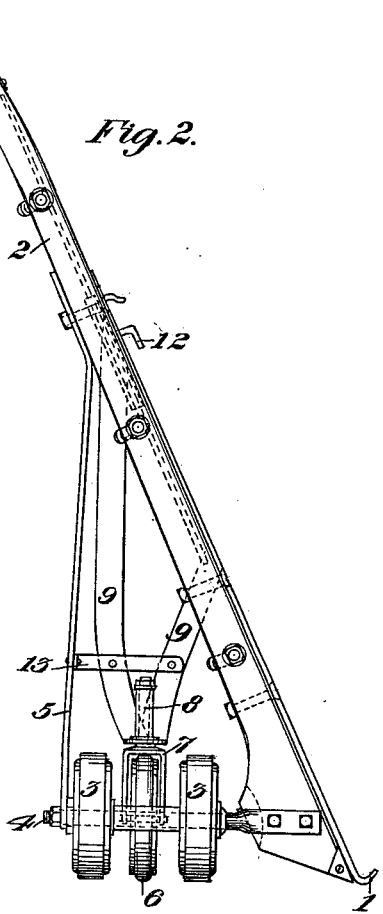
WITNESSES:
Thomas W. Bakewell.
N. B. Corwin
INVENTOR.
Robert McMillin.

(No Model.)
2 Sheets—Sheet 2.
R. McMILLIN.
TRUCK.
No. 394,385.
Patented Dec. 11, 1888.
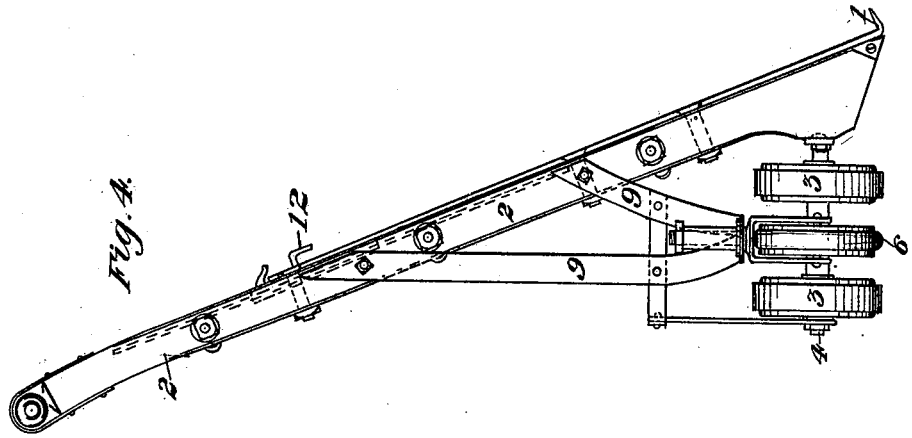
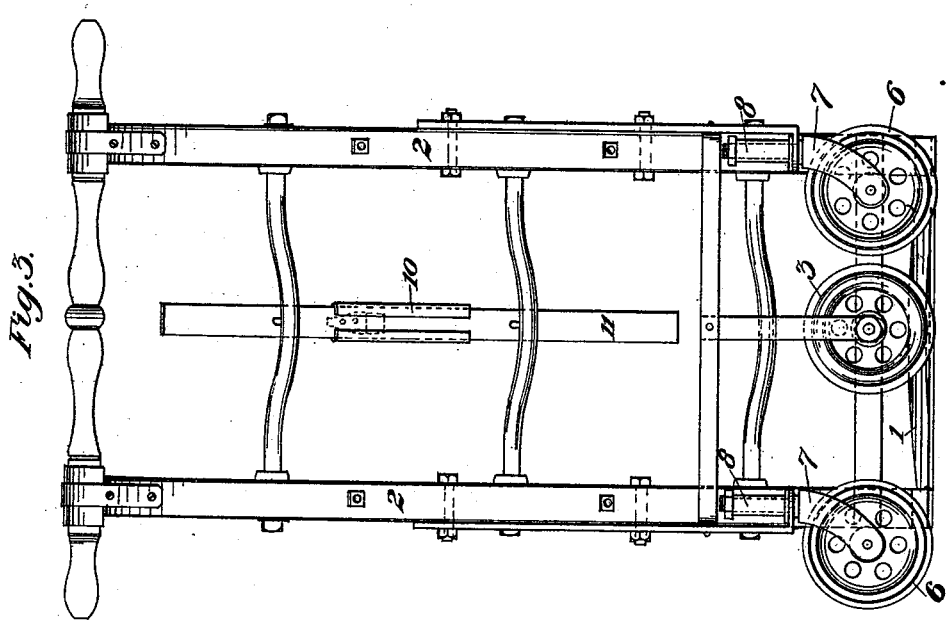
WITNESSES.
Thomas W. Bakewell,
R. T. B. Corwin
INVENTOR.
Robert McMillin.

UNITED STATES PATENT OFFICE.

ROBERT McMILLIN, OF PITTSBURG, PENNSYLVANIA.

TRUCK.

SPECIFICATION forming part of Letters Patent No. 394,385, dated December 11, 1888.

Application filed September 19, 1888. Serial No. 285,786. (No model.)

*To all whom it may concern:*

Be it known that I, ROBERT MCMILLIN, of the city of Pittsburg, in the county of Allegheny and State of Pennsylvania, have invented a new and useful Improvement in Trucks; and I do hereby declare the following to be a full, clear, and exact description thereof, reference being had to the accompanying drawings, forming part of this specification, in which—

Figure 1 is a front elevation of a truck constructed according to my invention. Fig. 2 is a side view thereof. Fig. 3 is a rear elevation of a modification. Fig. 4 is a side view of the truck shown in Fig. 3.

Like symbols of reference indicate like parts in each.

My improved truck is designed principally for use in carrying printers' type-forms, and I shall describe it with especial reference thereto, premising, however, that I do not thereby intend to limit the scope of my invention, since the truck may be used for carrying other articles of a similar shape, such as slabs of marble, &c.

Type-forms such as used by printers are, when filled with type, often of very considerable weight, and are difficult to carry from one part of a printing establishment to another. It has been the general custom in moving the forms to set the corner of the form on the floor and to drag it along thereon. In order to avoid the labor of thus moving the form and the wear occasioned to the floor thereby, trucks have sometimes been employed. These trucks were of the common sort, having small wheels at the forward end, which were directed in the line of the length of the truck. The practical disadvantage attending the use of such truck is that when the wheels meet an obstruction—such, for example, as the sill of a doorway—the jolt, being communicated to the type in the form in a direction at right angles to the plane of the form and lengthwise of the type, is apt to loosen or displace the type, and sometimes to knock them altogether out of the form into "pi." To avoid this danger and to provide means whereby type-forms may be moved with safety to the type, I have devised my present improvement, in which the type-forms are carried on the truck edgewise, so that in case of any jar or jolt the direction of force exerted thereby is lateral relative to the type, and, being resisted by the sides of the form, has no material tendency to dislodge the type from place.

Referring now to the drawings, 2 represents the body or platform of the truck, which may conveniently be made, as shown in the drawings, similar to the bodies of trucks now in common use for carrying boxes, trunks, and other merchandise, having at the base a projecting ledge or shelf, 1, which is serviceable in picking up and sustaining the article to be carried.

As shown in Figs. 1 and 2, the truck is provided at the forward end with two sets of wheels—one set at each side of the truck. One set of wheels, 3, is mounted on a fixed horizontal axle, 4, which is attached at one end directly to the body of the truck, and at the other end is attached to a vertical rod or stay, 5, which extends from the upper part of the truck-body. There are preferably two of the wheels 3 journaled on the same axle, as shown in Fig. 2, and from their position they are adapted to permit the motion of the truck sidewise and not directly forward. At the other side of the truck is a guide-wheel, 6, which is mounted on a horizontal axis forming part of an upright journal-frame, 7, this frame having an upright short axis or journal, which is eccentrically situated relatively to the wheel and is journaled in a hollow vertical sleeve, 8, this sleeve being preferably held by brace-rods 9, which extend to the truck-body, and also by a rod, 13, which extends from the braces 9 to the upright stay 5. The axis of the wheel 6 is therefore swiveled, and the wheel can be turned freely not only by a rotary motion on its horizontal axis, but also on the vertical axis of the journal of the frame 7, thus allowing the wheel to adapt itself automatically to the direction in which the truck is urged.

The operation of the truck in carrying type-forms is as follows: Suppose the form to be standing against a wall in an upright inclined position. In order to place the form on the truck, the latter is moved up to the form and the ledge 1 is placed at or beneath the lower edge of the form, which is then tilted back so that it shall rest on the body of the truck, the normal position of which, as determined by its supporting-wheels, is upright and somewhat backwardly inclined. The form may then be held securely on the truck by means of a slide-fastening, 10, which is mounted so as to slide lengthwise on a bar or plate, 11, fixed to braces of the truck-body. This fastening is provided with a downwardly-directed hook, 12, which is adapted to fit over and to hold the upper edge of the form. The truck can then be moved freely over the floor by grasping one or both of the handles at the top and pushing or pulling the truck sidewise, at the same time drawing back on the handle sufficiently to raise the ledge 1 clear of the floor and to cause the weight of the truck to bear altogether on the wheels. The swiveled wheel 6 permits the truck to be guided sidewise in any direction. As before explained, the motion of the truck being sidewise, and the type-form being placed thereon in a nearly upright position, there can be no dangerous jar or jolt given to the type by passage of the wheels over an obstruction.

The precise arrangement of the truck-wheels which I have shown in Figs. 1 and 2, while desirable for many reasons, is not essential to my invention, broadly considered. Other arrangements of the wheels may be employed—such, for example, as I have illustrated in Figs. 3 and 4. In the modification shown in the last-mentioned figures I place the two companion wheels 3 at the middle part of the truck-body and a swiveled wheel, 6, at each side, the purpose being to render the truck somewhat easier to guide in its motions. The details of construction of the parts shown in these figures are sufficiently illustrated in the drawings. Other modifications of the invention will be suggested by the foregoing description to those skilled in the art.

I claim—

1. A truck of the nature described having an upright supporting-platform and provided with one or more wheels journaled so as to be permanently directed laterally, substantially as and for the purposes described.

2. A truck of the nature described having an upright supporting-platform and provided with one or more wheels journaled so as to be permanently directed laterally, and one or more wheels having a swiveled axis, substantially as and for the purposes described.

3. A truck of the nature described having an upright supporting-platform, and having at the base a pair of side moving wheels journaled on substantially the same axis, so as to be permanently directed laterally, and one or more guide-wheels having a vertically-swiveled axis, substantially as and for the purposes described.

4. A truck of the nature described having an upright supporting-platform, side moving wheels at the base thereof, and a catch or hook which is movable to engage and hold the edge of a type-form or similar article placed on the truck, substantially as and for the purposes described.

In testimony whereof I have hereunto set my hand this 15th day of September, A. D. 1888.

ROBERT McMILLIN.

Witnesses:
W. B. CORWIN,
THOMAS W. BAKEWELL.